United States Patent [19]

Shepherd

[11] Patent Number: 4,771,565

[45] Date of Patent: Sep. 20, 1988

[54] BOTTOM TRAWL ROLLER

[76] Inventor: Glenn H. Shepherd, 1820 Grafton Rd., Elyria, Ohio 44035

[21] Appl. No.: 98,949

[22] Filed: Sep. 21, 1987

[51] Int. Cl.$^4$ .............................................. A01K 73/02
[52] U.S. Cl. .......................................... 43/9; 43/43.1
[58] Field of Search ........................... 43/7, 9, 14, 43.1

[56] References Cited

U.S. PATENT DOCUMENTS

| 2,895,255 | 6/1959 | Irwin | 43/44.88 |
| 3,023,529 | 3/1962 | Luketa | 43/9 |
| 3,256,578 | 6/1966 | Luketa | 43/9 |
| 3,657,837 | 4/1972 | Price et al. | 43/43.1 |
| 4,299,047 | 11/1981 | Collins | 43/9 |
| 4,381,617 | 5/1983 | McSweeny, Jr. | 43/9 |

FOREIGN PATENT DOCUMENTS

| 0021009 | of 1904 | United Kingdom | 43/9 |
| 0022593 | of 1909 | United Kingdom | 43/9 |
| 0013659 | of 1912 | United Kingdom | 43/9 |
| 0020994 | of 1913 | United Kingdom | 43/9 |

Primary Examiner—Nicholas P. Godici
Assistant Examiner—Karen Skillman
Attorney, Agent, or Firm—Gustalo Nunez

[57] ABSTRACT

The present invention is directed to a novel device for reducing the friction which is generated when a trawl net is dragged along the ocean bottom. A trawl net, as it is being dragged in a forwardly direction, comes in contact with not only debris on the ocean floor but also with the substrate comprising the ocean floor, thus increasing the friction being applied to the net, which reduces the life of the net. The novel device contemplated herein is a device which is generally spherical in configuration, although somewhat elongated in one direction resembling a bobbin. The device is made of at least two parts which can be easily placed on the net webs or net lines, preferably at a rearwardly location with respect to the forward movement of the net. As the net is being pulled, the device, which is in contact with the ocean bottom, rolls, thereby reducing the contact between the net and the ocean bottom and also maintaining the net at a distance certain from the ocean bottom. This friction reducing device works particularly well with the type of trawl nets used in shrimp fishing.

2 Claims, 3 Drawing Sheets

BOTTOM TRAWL ROLLER

BACKGROUND OF THE INVENTION

This invention is directed to nets in general and, more specifically, to shrimp trawls. Shrimp are a small decopod crustacean. They live on the bottom of the ocean and tend to inhabit sandy coast bottom. They are usually caught by fishing for them with what is called a shrimp trawl. This is a type of net that is pulled across the bottom of the water body being fished. The trawl is attached to a boat by towlines. The trawls can be pulled at any speed; faster speeds produce more shrimp, although faster speed is not an absolute necessity to catching shrimp.

The trawl is open at one end; as the trawl is being towed across the bottom, shrimp are entrapped in the trawl. The trawl is usually a wide funnel-shaped net in which the open end is kept open by some type of frame work or other means.

It can be seen that a net that is pulled across the sea bottom would tend to receive a great deal of abuse. For example, the trawl can be dragged across sharp objects which may be buried in the substrate. This could, and in actual practice does, cause damage to the trawl which requires the fisherman to remove the trawl from service and have it repaired, a process which could be time consuming and expensive.

Also, because of the inherent nature of this type of shrimping, i.e. dragging the trawl across the ocean bottom, it can easily be seen that friction exists between the trawl and the ocean substrate. This friction also decreases the longevity of the trawl and increases the force with which the trawl must be pulled, thereby increasing the useage of motor fuel on the part of the boat.

Some of the prior art has dealt with the problem of trawl fishing. U. S. Pat. No. 4,381,617 is directed to a device for reducing the friction of a bottom contacting fishnet by enclosing the leadline of the net with a flexible bearing means which can be a tube of flexible polyethylene film. The film serves as a bearing surface for the leadline as it is dragged across the substrate.

U. S. Pat. No. 3,023,529 is directed to a trawl net which is provided with riblines to which are attached chafing gear strips which, according to the disclosure, tends to reduce friction between the trawl and the bottom substrate.

Also, U. S. Pat. No. 4,299,047 tends to solve the friction problem by providing wheels to a beam trawl.

There exist two types of trawl net structures that are used in shrimping. There is the beam trawl in which the mouth of the trawl net is kept open by some type of frame work. Also, there is the other trawl in which a device known as the trawl door, which is sometimes referred to as an otter door, serves to keep the net open and to keep the bottom close to the substrate by adjusting the angle of the trawl door as the trawl is being pulled across the ocean bottom. In any event, whatever type of trawl net is used, abuse and wear is inflicted to the net to the extent that the net can be rendered useless, i.e. the loss of shrimp and/or the loss of the net. As mentioned previously, the trawl must be taken out of service and materials and labor must be expended to repair the trawl. This repair can take a considerable amount of time.

SUMMARY OF THE INVENTION

The present invention is directed to a trawl roller which can be snapped onto the net webbing very quickly and very inexpensively. The trawl roller, when assembled, appears to be an elongated hemispherical device terminating in a collar at each end. The collar is equipped with an opening which is utilized to be encased over a web or leadline. The collar is further provided with a recess for receiving a snap-on ring. Specifically, the trawl roller is comprised of two hemispherical parts held together by a snap-on ring at each end.

The trawl roller contemplated here can be used with beam trawls, other trawls or any other type of seine which is dragged across the substrate bottom. As the trawl is being pulled, the trawl rollers will rotate, thus reducing the friction force between the trawl and ocean bottom, and also keeping the trawl elevated from the ocean bottom to the extent that the abuse inflicted on the net is greatly reduced.

DESCRIPTION OF THE PREFERRED EMBODIMENT

Figure 1:
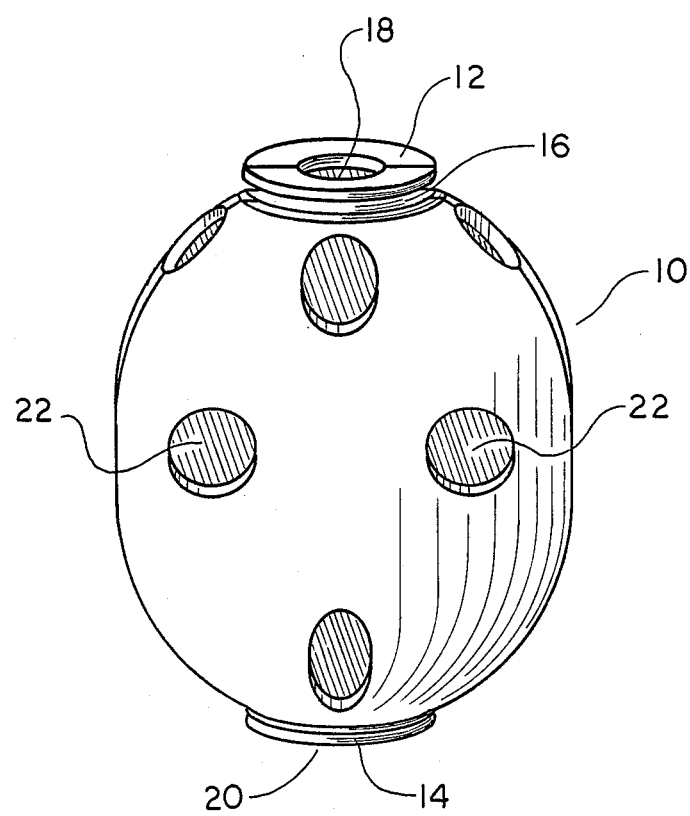
FIG. 1 is an elevation view of the trawl roller.

This invention is directed to an improved bearing device for use on nets which are utilized for entrapping shrimp and other aquatic animals which live on the sea bottom. The bearing device which is hereinafter referred to as a trawl roller is illustrated in FIG. 1 and is designated as 10. The trawl roller 10 has the configuration of a cylindrical bobbin. The trawl roller is provided with a pair of collars 12 and 14 at each end thereof. Each collar 12 and 14 is provided with a recess 16 and an opening 18 and 20. The trawl roller 10 is further provided with a plurality of openings 22 throughout.

Figure 2:
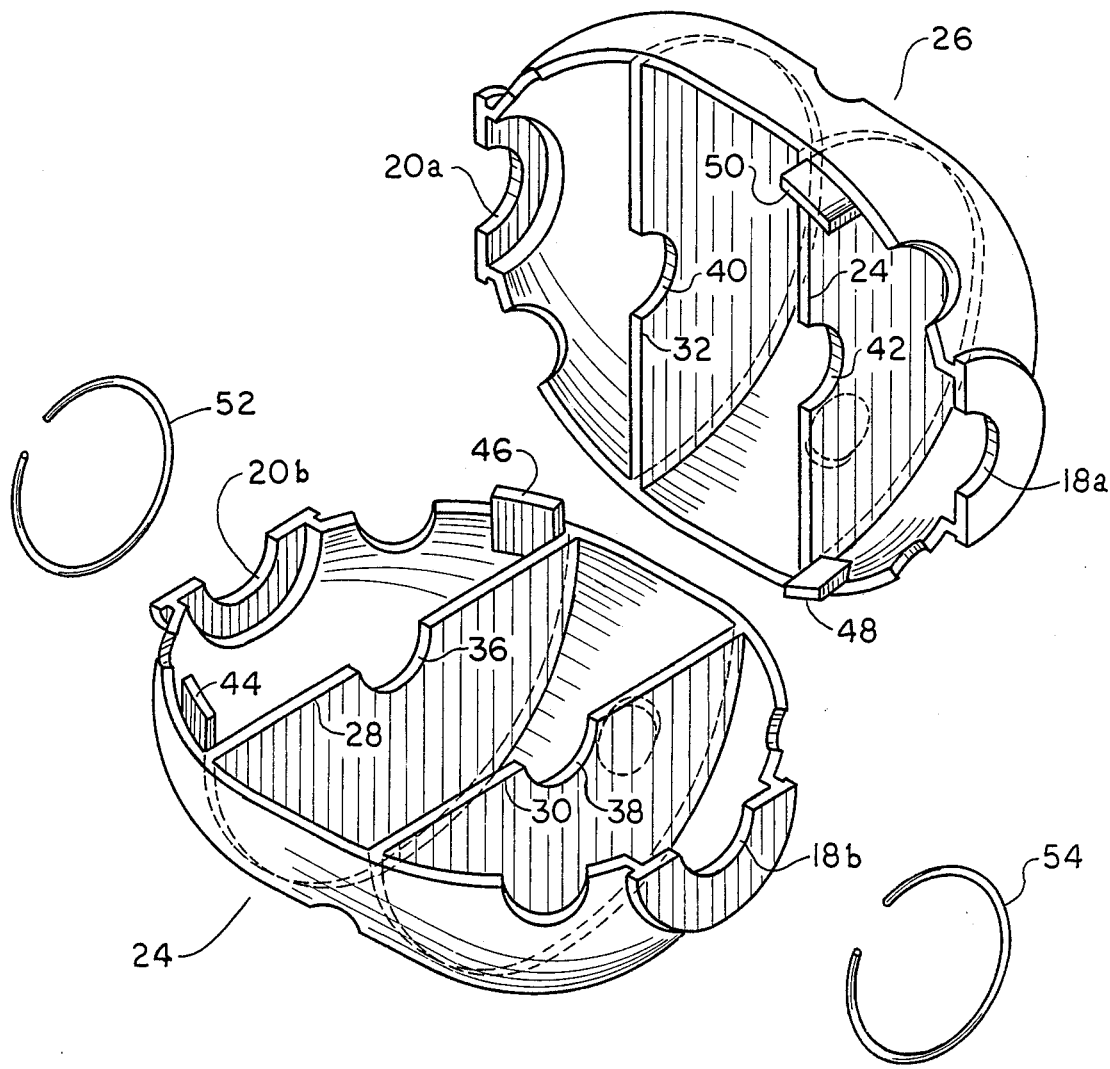
FIG. 2 is an exploded elevation view, partly in cross-section, of the trawl roller.

Referring now to FIG. 2, the trawl roller 10 is shown in a disassembled condition. As can be seen, it is comprised of two elongated clam like shells, 24 and 26. At the ends of the shells 24 and 26 are openings 18b, 18a, 20a and 20b. Internal to the shells 24 and 26 are provided hemispheric shoulder portions 28, 30, 32, 34 respectively. Each of the aforementioned shoulder portions is provided with a recess 36, 38, 40, 42 respectively. At one end of each of the shells 24 and 26 are located a pair of outwardly extending tabs 44, 46, 48 and 50 respectively.

Installing the trawl roller 10 is accomplished simply by placing the shells 24 and 26 on the webbing or lead lines of the trawl by locating the webbing in the recesses provided on each shell. As can be seen, the recesses are all located on the longitudinal axis of each of the shell halves 24 and 26. The halves are mated together with the tabs 44, 46, 48 and 50 insuring that the half members are perfectly aligned with each other. Locking rings 52 and 54 are inserted into the recesses 16 provided on each collar 12 and 14. The simplicity with which the trawl roller 10 is assembled facilitates its placement on the trawl webbing quickly and easily. It is not necessary to cut into the net, thus greatly reducing the time required to place the trawl roller on the net. As can be seen from the prior art, the bearing devices described therein are difficult to place on the trawl. Although the tabs 44, 46, 48 and 50 are shown to be positioned at one end, they may be positioned such that a tab is located at each end of the shell 24 and on opposite sides. This provides yet another avenue for facilitating the mating of the shell halves 24 and 26.

Figure 3:
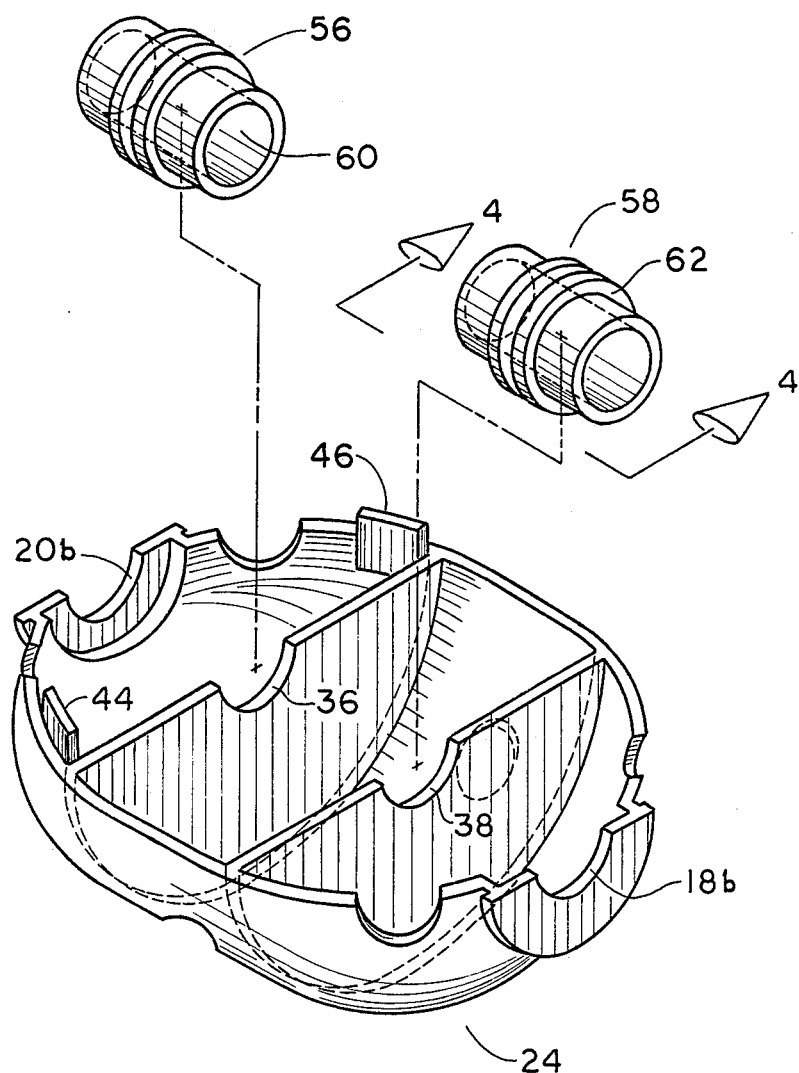
FIG. 3 is an elevation view of one portion of the trawl roller with additional bearing means.
Figure 4:
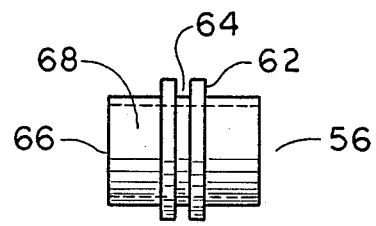
FIG. 4 is a plan view of the additional bearing means.

FIG. 3, which illustrates one half 24 of the travel roller 10, shows a pair of bearing devices 56 and 58 which provide additional protection to the webbing and/or leadline when placed on the shoulder portions 28 and 30.

The bearing devices 56 and 58 are identical, thus one description shall suffice. Bearing device 56 is an elongated cylinder with an opening 60 located central to the elongated cylinder. Bearing device 56 is provided with a collar 62 having a recess 64. The bearing device is comprised of two half members 66 and 68 which are mirror images of each other. When mated together, the half portions are held together by placing a locking ring over the recess 64. Also, as indicated above, the bearing devices 56 and 58 are shown as two separate devices. However, another modification (not shown in the drawings) would be an elongated cylindrical sheath which would extend beyond to openings defined by the collars 18 and 20. The elongated sheath would be comprised of two identical halves and held together by a locking ring such as 54. This would provide protection for the webbing throughout the entire interior of the trawl roller 10.

The plurality of openings provided on the trawl roller 10 function to remove any buoyancy that the trawl roller 10 may have, in order that it not have an influence on the trawl as far as applying any downward or upward force. In the preferred embodiment, the trawl roller 10 is made of a material immune to the corrosive effects of sea water, such as a hard plastic.

The invention may be embodied in other specific forms without departing from the spirit thereof. The preferred embodiment is therefore to be considered in all respects as illustrative and not restrictive, the scope of the invention being indicated by the appended claims, rather than by the foregoing specification.

What I claim is:

1. In a bottom contacting trawl, a trawl roller comprising:

first and second arcuately shaped substantially hollow members, each arcuately shaped member having first and second ends thereof, each end provided with a collar having a recess thereon, and an opening located on the longitudinal axis of said arcuately shaped members, further said arcuately shaped members provided with a plurality of openings throughout the surface thereof, a pair of arcuate shaped tabs extending outwardly from said arcuately shaped members and being positioned on each of said first and second arcuately shaped members in opposed relationship with respect to each other, said first and second arcuately shaped members enclosing the leadline of a net, said leadline positioned in the openings formed by the recesses provided on each of said collars, said arcuately shaped members held together by locking means located on each of said collars.

2. A trawl roller comprising:

a bobbin member including a pair of elongated hemispheric members, each hemispheric member having a longitudinal axis generally identical to each other, each elongated hemispheric member having first and second terminating ends, said terminating ends provided with a generally circular shoulder, each shoulder having an opening thereon, each elongated hemispherical member being further provided with at least one reinforcing shoulder member positioned generally interiorly central of said first and second terminating ends, further, semicircular recesses being provided on said collars and said reinforcing shoulder, all said semicircular recesses in general alignment with said longitudinal axis, further, each elongated hemispherical member provided with a pair of opposing tabs and located internally of said elongated hemispherical member, said pair of elongated hemispherical members enclosing a line of a net, said line positioned within said aligned recesses provided on said collars and reinforcing shoulder, said elongated hemispherical members being aligned to each other by said opposing tabs and said elongated hemispherical members removably held together by locking means provided onto each of said collars, said elongated hemispherical members being further provided with a plurality of openings throughout the entire outside surface thereof, said trawl roller serving to keep said trawl elevated a predetermined distance from said bottom.

* * * * *